United States Patent
Ogawa (10) Patent No.: US 10,941,868 B2
(45) Date of Patent: Mar. 9, 2021

(54) VALVE SEAT AND VALVE STRUCTURE

(71) Applicant: IWAKI CO., LTD., Tokyo (JP)

(72) Inventor: Yoshio Ogawa, Saitama (JP)

(73) Assignee: IWAKI CO., LTD., Tokyo (JP)

( * ) Notice: Subject to any disclaimer, the term of this patent is extended or adjusted under 35 U.S.C. 154(b) by 0 days.

(21) Appl. No.: 16/468,206

(22) PCT Filed: Dec. 13, 2016

(86) PCT No.: PCT/JP2016/087053
§ 371 (c)(1),
(2) Date: Jun. 10, 2019

(87) PCT Pub. No.: WO2018/109839
PCT Pub. Date: Jun. 21, 2018

(65) Prior Publication Data
US 2019/0390778 A1 Dec. 26, 2019

(51) Int. Cl.
*F16K 1/42* (2006.01)
*F16K 31/12* (2006.01)
(Continued)

(52) U.S. Cl.
CPC ............ *F16K 1/42* (2013.01); *F04B 53/1002* (2013.01); *F04B 53/1005* (2013.01);
(Continued)

(58) Field of Classification Search
CPC ... F16K 1/42; F16K 1/14; F16K 31/12; F04B 53/1005; F04B 53/1087; F04B 53/1002;
(Continued)

(56) References Cited

U.S. PATENT DOCUMENTS 3,901,475 A   8/1975 Dreibelbis
4,346,731 A * 8/1982 Sigworth, Jr. .......... F24S 90/10
                                                137/433
(Continued)

FOREIGN PATENT DOCUMENTS

JP    H09-203380 A    8/1997
JP    2000-320696 A   11/2000
(Continued)

OTHER PUBLICATIONS

Supplementary European Search Report issued to EP16924198.

*Primary Examiner* — Kenneth Rinehart
*Assistant Examiner* — Patrick C Williams
(74) *Attorney, Agent, or Firm* — Taro Yaguchi (57) ABSTRACT

This valve seat is disposed below a valve ball, wherein the valve seat comprises an annular member in which a seating surface and a lower end surface of the valve ball are formed into a circular shape; a flow path is formed between the seating surface and the lower end surface, for communicating a transfer fluid including a gas and a liquid; and the flow path is formed in a predetermined shape in which a horizontal distance from the central axis which crosses the lower end surface at right angle to the inner circumferential surface of the flow path excluding the seating surface and the lower end surface is not constant over the entire circumference of the flow path.

6 Claims, 7 Drawing Sheets (51) Int. Cl.
    *F04B 53/10*         (2006.01)
    *F16K 1/14*          (2006.01)
    *F04B 53/06*         (2006.01)
    *F04B 43/02*         (2006.01)
    *F04B 13/00*         (2006.01)

(52) U.S. Cl.
    CPC ............ *F04B 53/1087* (2013.01); *F16K 1/14* (2013.01); *F16K 31/12* (2013.01); *F04B 13/00* (2013.01); *F04B 43/02* (2013.01); *F04B 53/06* (2013.01); *Y10T 137/791* (2015.04)

(58) Field of Classification Search
    CPC .......... F04B 53/06; F04B 43/02; F04B 13/00; Y10T 137/791
    See application file for complete search history.

(56) References Cited

U.S. PATENT DOCUMENTS

| | | | | |
|---|---|---|---|---|
| 5,593,289 A | * | 1/1997 | Tarpley | ................. F04B 53/005 137/533.11 |
| 5,593,292 A | * | 1/1997 | Ivey | .................... F04B 53/1007 137/533.15 |
| 6,755,628 B1 | | 6/2004 | Howell | |
| 2012/0216884 A1 | * | 8/2012 | Dong | ................. F04B 53/1002 137/512 |
| 2014/0119952 A1 | | 5/2014 | Adachi | |
| 2015/0110654 A1 | | 4/2015 | Bubb | |

FOREIGN PATENT DOCUMENTS

| | | |
|---|---|---|
| JP | 2008-128416 A | 6/2008 |
| JP | 2013015133 A | 1/2013 |

\* cited by examiner

A – A' CROSS SECTION

FIG. 5

B – B' CROSS SECTION

C – C' CROSS SECTION

VALVE SEAT AND VALVE STRUCTURE

FIELD OF THE INVENTION

This invention relates to a valve seat and a valve structure.

BACKGROUND OF THE INVENTION

Various pump devices for transferring fluids are known, such as a magnet pump, a metering pump, and a rotary displacement pump. Among them, for example, a reciprocating pump, as a metering pump for introducing a transfer fluid into the pump chamber via a suction valve by the reciprocating motion of a reciprocating member such as a diaphragm, and discharging the transfer fluid from the pump chamber via a discharge valve, uses ball valves as the suction and discharge valves. The ball valve is known to cause a gas lock state when the gas generated from the transfer fluid in the pump chamber and the gas such as air sucked with the transfer fluid remain in the lower part of a valve.

In order to prevent such a gas lock state, a reciprocating pump provided with an automatic gas-venting mechanism has been proposed (see Patent Document 1 below). In this reciprocating pump, the passage immediately after the discharge valve is branched into a discharge liquid path extending horizontally to a discharge port and a gas-venting path extending immediately above. Furthermore, a gas-venting valve is provided to the gas-venting path, and the gas-venting valve consists of one ball valve and valve seats positioned at the upper and lower sides thereof.

The gas-venting valve is configured to have an incomplete seal in which the adhesion between the valve ball and the valve seats thereon is intentionally impaired. Therefore, during the suction stroke, liquids and gases from the outside are prevented to leak in by the valve ball and the lower valve seat in the same manner as a normal ball check valve. On the contrary, during the discharge stroke, a small amount of gas mixed in the liquid is efficiently discharged to the outside through the incomplete seal between the valve ball and the upper valve seat.

Prior Art Document

Patent Document 1

JP Patent Publication No. H9-203380

SUMMARY OF THE INVENTION

Problem to be Solved by the Invention

Nevertheless, in the conventional reciprocating pump disclosed in the Patent Document 1, the valve ball and the upper valve seat forms an incomplete seal. Therefore, although it is a preferable form from the viewpoint of preventing gas lock, it was hardly a preferable form from the viewpoint of the sealability of valve ball.

The present invention has been made in view of the above circumstances, and an object thereof is to provide a valve seat and a valve structure capable of preventing the occurrence of gas lock while maintaining the sealability of valve ball.

Means for Solving the Problem

A valve seat according to the present invention is a valve seat disposed below a valve ball, comprising an annular member having in a center thereof a hole section forming a flow path through which a transfer fluid flows, wherein, the valve seat is arranged so that a central axis of the hole section is set in an up-and-down direction, and comprises a seating surface on which the valve ball seats connected to an upper end of the hole section and fitting to an external shape of the valve ball, and a lower end surface connecting to the lower end of the hole section, and wherein the hole section is formed in a predetermined shape so that a horizontal distance from the central axis to an inner circumferential surface of the hole section is not constant over an entire circumference of the inner circumferential surface of the hole section.

According to one embodiment of the present invention, the predetermined shape is a shape in which a difference between a maximum value and a minimum value of the horizontal distance throughout the entire circumference of the inner circumferential surface of the hole section is 10% or more and 30% or less of the maximum value.

According to another embodiment of the present invention, the predetermined shape is one of a partially deformed circular shape, an elliptical shape, a drop shape, a concaved shape, an eccentric circular shape, an overlapping circular shape, a cross shape, a rectangular shape, and a triangle shape, when viewed at a horizontal cross section.

A valve structure according to the present invention is a valve structure having a valve ball, a valve seat disposed below the valve ball, and a seat holder supporting the valve seat, wherein the valve seat comprises an annular member having in a center thereof a hole section forming a flow path through which a transfer fluid flows, the valve seat is arranged so that a central axis of the hole section is set in an up-and-down direction, the valve seat comprises a seating surface on which the valve ball seats connected to an upper end of the hole section and fitting to an external shape of the valve ball, and a lower end surface connecting to the lower end of the hole section, the seat holder comprises a holder flow path communicating with the seat flow path;

the hole section is formed in a predetermined shape in which a horizontal distance from the central axis to an inner circumferential surface of the hole section is not constant throughout an entire circumference of the inner circumferential surface of the hole section; and the holder flow path comprises a plurality of ridges protruding toward the central axis from an inner circumferential surface of the holder flow path, arranging at equal intervals in the circumferential direction and extend parallel to the central axis.

According to one embodiment of the present application, the predetermined shape is a shape in which a difference between a maximum value and a minimum value of the horizontal distance across the entire circumference of the inner circumferential surface of the hole section is 10% or more and 30% or less of the maximum value.

According to another embodiment of the present application, the predetermined shape is one of a partially deformed circular shape, an elliptical shape, a drop shape, a concaved shape, an eccentric circular shape, an overlapping circular shape, a cross shape, a rectangular shape, and a triangle shape, when viewed at a horizontal cross section.

According to yet another embodiment of the present application, the valve structure comprises two valve balls arranged vertically, the valve seat is respectively provided below each of the valve balls, and the seat holder supports the lower end surface of the lower valve seat.

Effect of the Invention

According to the present invention, occurrences of gas lock can be prevented while maintaining the sealability of the valve ball.

DETAILED DESCRIPTION OF THE INVENTION

A valve seat and a valve structure according to embodiments of the present invention will be described in detail below with reference to the attached drawings. In the following embodiments, no invention described in each claim is intended to be limited. Nor is it that all the combinations of features described in embodiments are absolutely necessary as means of solving the problems. In addition, although the following embodiments illustrate a case in which it was configured as a metering pump by applying the valve structure of this invention to the suction valve and discharge valve and it includes the valve seat of this invention as a component, the present invention is not limited to pump devices.

Figure 1:
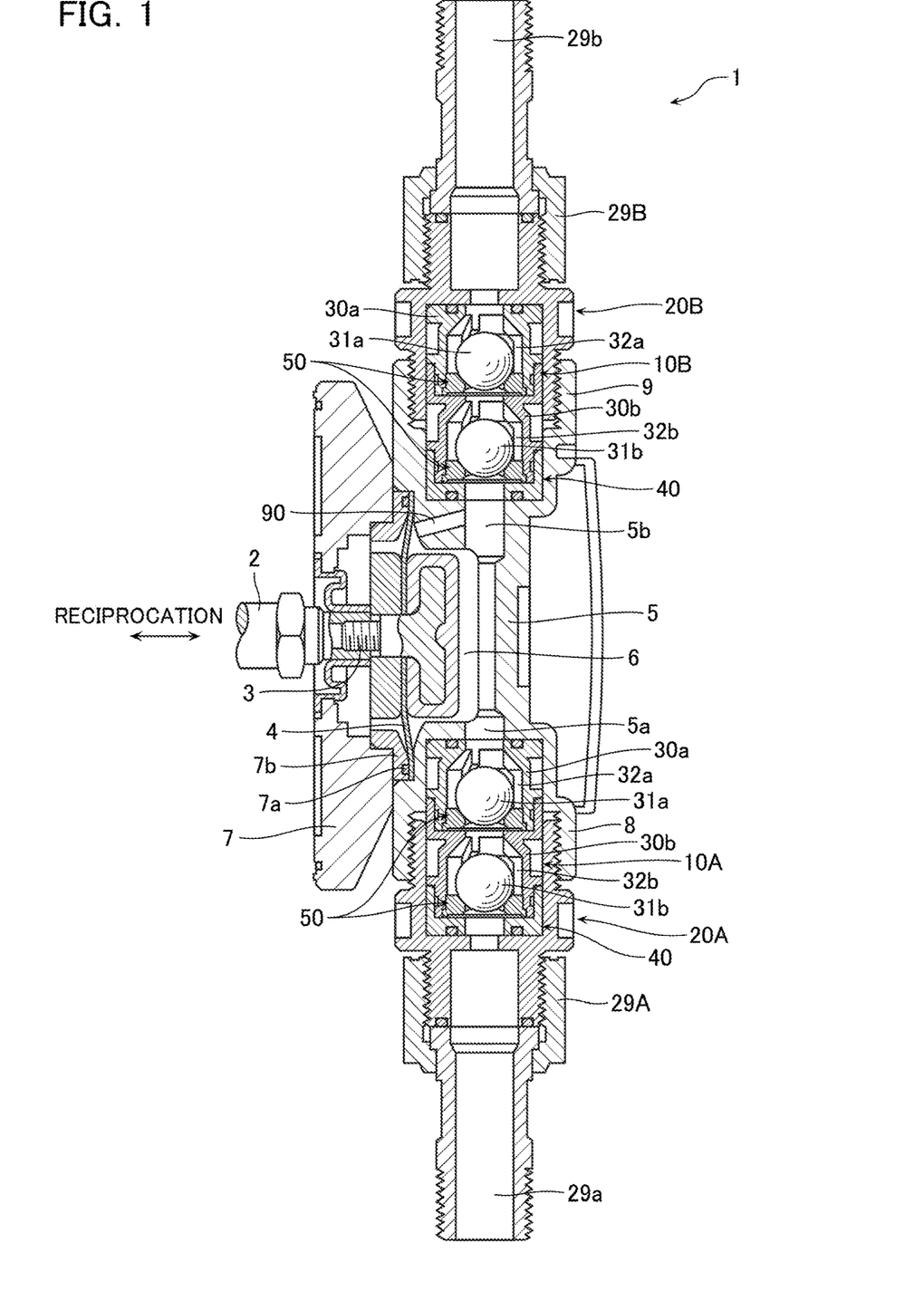
FIG. 1 is a cross-sectional view showing the main part of a reciprocating pump to which a valve seat and a valve structure according to an embodiment of the present invention are incorporated.
Figure 2:
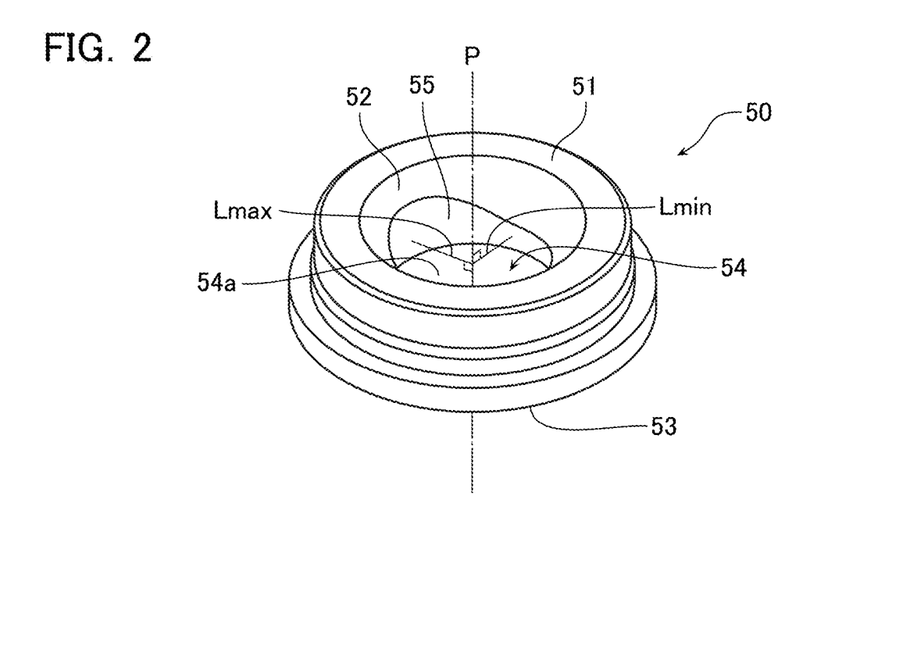
FIG. 2 is a perspective view showing the valve seat of the same reciprocating pump.
Figure 3:
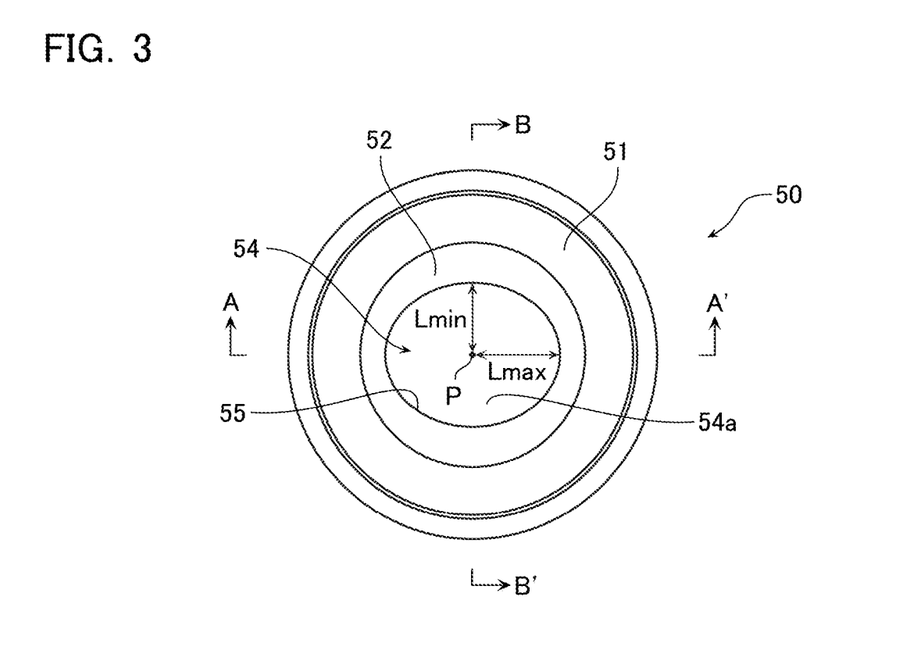
FIG. 3 is a plan view showing the same valve seat.
Figure 4:
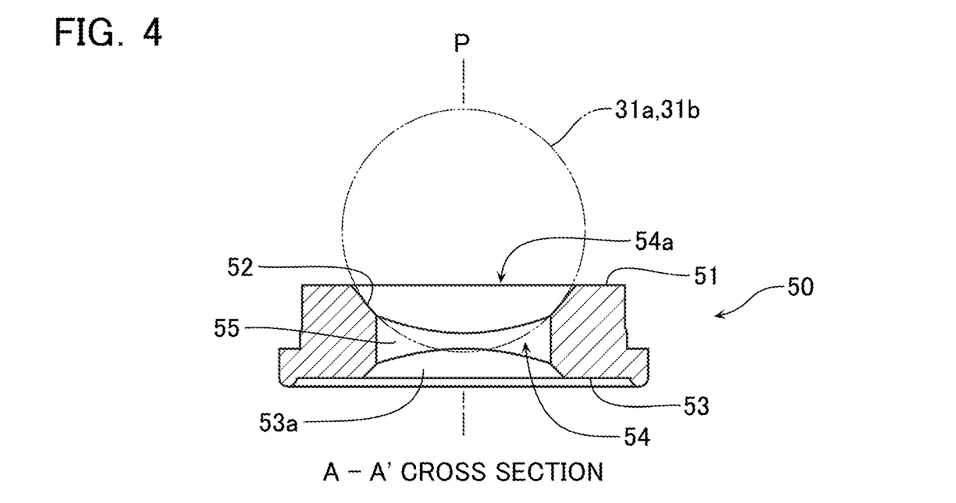
FIG. 4 is a cross-sectional view taken along the line A-A' of FIG. 3.
Figure 5:
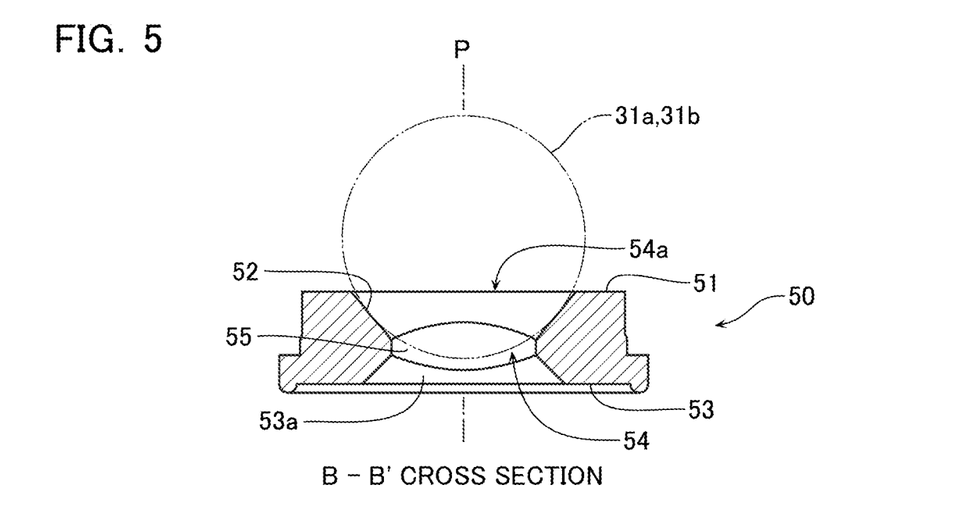
FIG. 5 is a cross-sectional view taken along the line B-B' of FIG. 3.

FIG. 1 is a cross-sectional view showing the main part of a reciprocating pump to which a valve seat 50 and a valve structure according to an embodiment of the present invention are applied. FIG. 2 is a perspective view showing a valve seat 50 of this reciprocating pump, and FIG. 3 is a plan view showing the valve seat 50. FIG. 4 is a cross-sectional view taken along the line A-A' of FIG. 3, and FIG. 5 is a cross-sectional view taken along the line B-B' of FIG. 3.

Figure 6:
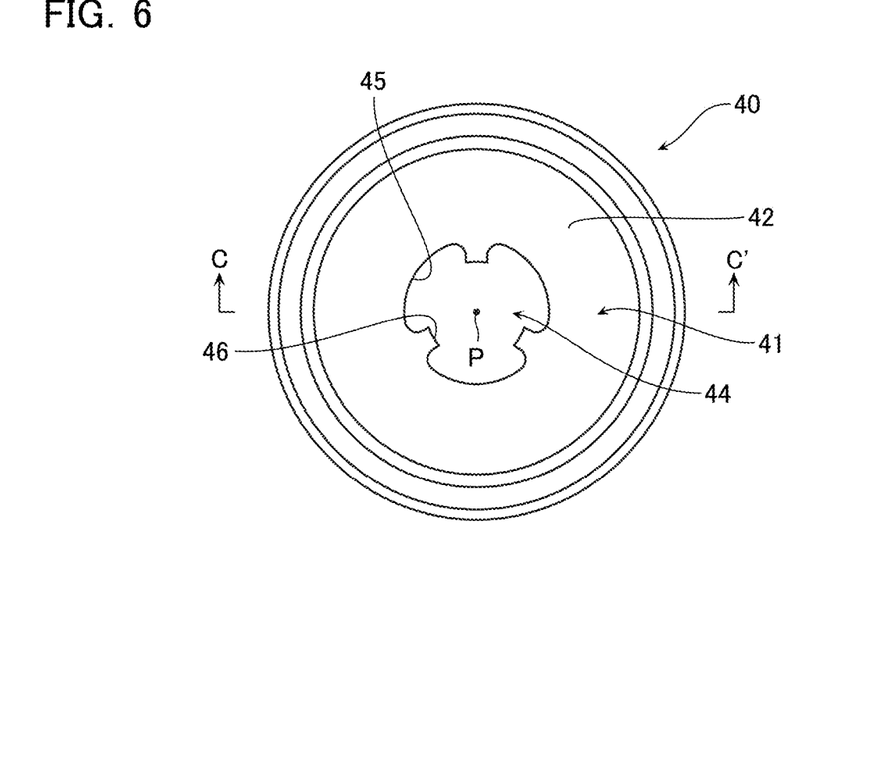
FIG. 6 is a plan view showing a seat holder of the reciprocating pump.
Figure 7:
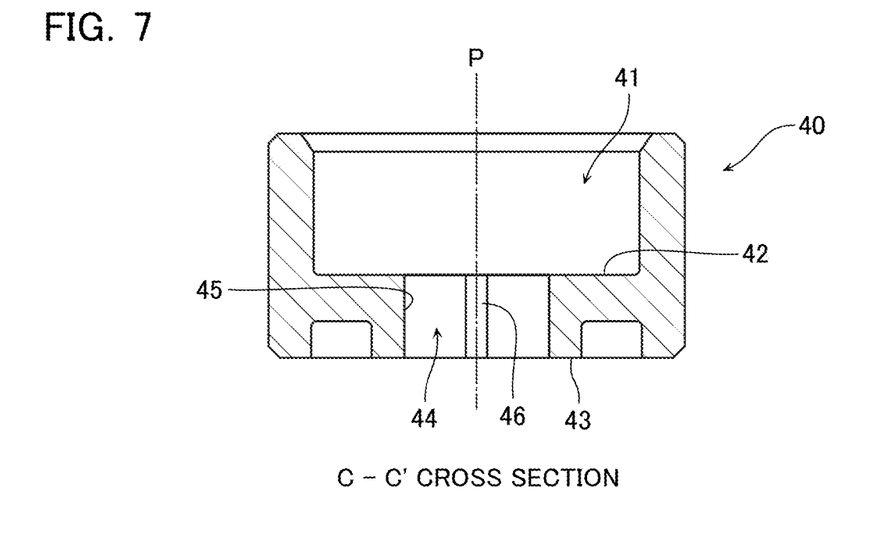
FIG. 7 is a cross-sectional view taken along the line C-C' of FIG. 6.

Furthermore, FIG. 6 is a plan view showing a seat holder 40 of this reciprocating pump, and FIG. 7 is a cross-sectional view taken along the line C-C' of FIG. 6.

As shown in FIG. 1, a metering pump 1 provided with a valve seat 50 and a valve structure according to an embodiment of the present invention has, for example, a rod-like drive shaft 2. The drive shaft 2 is reciprocally driven in directions indicated by the arrows in the drawing by the motor driving force, electromagnetic force or the like of the pump main body (not shown). A flexible diaphragm 4 is attached to the tip of the drive shaft 2 via an insert bolt 3.

The diaphragm 4 forms a pump chamber 6 with a pump head 5. A transfer fluid including liquid and gas is introduced into the pump chamber 6 and discharged. The periphery of a diaphragm 4 is sandwiched between the pump head 5 and a bracket 7 via a cushioning material 7a and a spacer 7b which assist the seal of the diaphragm 4. The pump head 5 is formed with a suction port 5a communicating with the lower side of the pump chamber 6 and a discharge port 5b communicating with the upper side of the pump chamber 6. In addition, above the pump chamber 6, a gas-venting path 90 connected to the discharge port 5b is provided.

The pump head 5 is formed with a connection port 8 on the suction side of transfer fluid disposed below the suction port 5a and a connection port 9 on the discharge side disposed above the discharge port 5b. The connection ports 8 and 9 are in communication with the pump chamber 6 via the suction port 5a and the discharge port 5b, respectively. The connection adapters 20A and 20B are connected to the connection ports 8 and 9 via the suction valve 10A and the discharge valve 10B, respectively.

The connection adapters 20A and 20B are respectively connected to a joint 29A connecting the suction side flow path 29a of transfer fluid to the connection adapter 20A and to a joint 29B connecting the discharge side flow path 29b of transfer fluid to the connection adapter 20B. Thus, the suction side flow path 29a and the pump chamber 6 are connected via the joint 29A, the connection adapter 20A, the suction valve 10A, and the suction port 5a on the connection port 8. Further, the discharge side flow path 29b and the pump chamber 6 are connected via the joint 29B, the connection adapter 20B, the discharge valve 10B, and the discharge port 5b below the connection port 9.

The suction valve 10A and the discharge valve 10B have, for example, cylindrically formed case bodies 30a and 30b which can be stacked vertically, and two valve balls 31a and 31b built in the case bodies 30a and 30b. Further, the suction and discharge valves 10A and 10B comprises, inside the respective case bodies 30a and 30b, valve guides 32a and 32b provided above the respective valve balls 31a and 31b and valve seats 50 attached to the case bodies 30a and 30b disposed below the valve balls 31a and 31b. Therefore, each of the suction and discharge valves 10A and 10B of the present embodiment is formed of two stage-valves in which these respective parts are arranged in upper and lower stages. The suction valve 10A and the discharge valve 10B each include a seat holder 40 that supports the lower valve seat 50 and is attached to the lower end side of the case body 30b.

The valve balls 31a and 31b may be made of a material having a specific gravity greater than that of the transfer fluid, for example, ceramic or metal. Also, the valve guides 32a and 32b may be formed of a material such as titanium or PVC. Furthermore, the valve seat 50 may be formed of a rubber material or the like.

As shown in FIGS. 2 to 5, the valve seat 50 is formed of an annular member having a hole section 54a at the center and having an outer diameter that gradually increases from the upper end to the lower end. The valve seat 50 has a circular planar upper end surface 51 and a seating surface 52 formed in a tapered cone-shape or a mortar-shape which fits the external shape of the valve ball 31a, 31b and on which the valve ball 31a, 31b seats, and a lower end surface 53 which has a circular planer shape like the upper end surface 51.

Furthermore, the hole section 54a of the valve seat 50 communicates the seating surface 52 with the lower end surface 53 to form a seat flow path 54 through which the transfer fluid flows. As shown in FIGS. 4 and 5, a gas accumulation section 53a is formed between the seat flow path 54 and the lower end surface 53, in which the gas in the transfer fluid accumulates. The seat flow path 54 is formed in a predetermined shape such that, for example, the horizontal distance L from the center axis P which crosses the lower end surface 53 at right angle to the seat flow path's inner circumferential surface 55 excluding the seating surface 52 and the lower end surface 53 is not constant over the entire circumference (over 360 degrees) of the seat flow path's inner circumferential surface 55.

The predetermined shape of the seat flow path 54 is preferably a shape in which the difference between the maximum value Lmax and the minimum value Lmin of the horizontal distance L from the central axis P across the entire circumference of the inner circumferential surface 55 of the seat flow path 54 is, for example, 10% or more and 30% or less, preferably 15% or more and 20% or less of the maximum value Lmax, as shown in FIG. 3. Specifically, the seat flow path 54 shown in FIGS. 2 to 5 is formed to have an elliptical shape at a horizontal cross section.

Here, a valve seat is generally formed in a circular shape in which both the seating surface and the seat flow path thereof are concentric. Therefore, when the pump device is operated with a gas staying in the lower part of the valve seat or in the gas accumulation section, the gas spreads annularly over the entire circumference of the inner circumferential surface of the seat flow path below the valve ball and pushes the valve ball upward.

In this case, if the force to lift the valve ball is dispersed over the entire circumference and when the amount of gas mixed in the transfer fluid is large, the compression force of the transfer fluid by the pump device becomes insufficient in many cases, causing a gas lock state.

On the other hand, in the valve seat 50 of the present embodiment, while the valve ball 31a, 31b and the seating surface 52 form a complete seal, the seat flow path 54 as described above forms a shape that is not constant over the entire circumference of the seat flow path's inner circumferential surface 55. For this reason, when the gas in the transfer fluid remained below the valve seat 50 accumulates in the gas accumulation section 53a and the gas ascends from the gas accumulation section 53a to the seat flow path 54, the gas is concentrated and is ascended toward a section on the seat flow path's inner circumferential surface 55 where the horizontal distance L becomes the maximum value rather than a section on the seat flow path's inner circumferential surface 55 where the horizontal distance L becomes the minimum value.

Thereby, even if the compression force of the transfer fluid by the metering pump 1 is small, the valve ball 31a, 31b that is seated on and in close contact with the seating surface 52 of the valve seat 50 can be sufficiently lifted up by the gas that passes the seat flow path 54 in a focal manner. Therefore, it becomes possible to exhaust the gas toward the valve guide 32a, 32b. Therefore, according to the valve seat 50 of the present embodiment, the occurrence of gas lock state can be effectively prevented while maintaining the sealing property of the valve ball 31a, 31b.

Here, the reason why the difference between the maximum value Lmax and the minimum value Lmin of the horizontal distance L from the central axis P with respect to the predetermined shape of the seat flow path 54 is set as 10% to 30% of the maximum value Lmax is explained. That is, when the difference between the maximum value Lmax and the minimum value Lmin of the horizontal distance L is large, the minimum value Lmin needs to be set small to secure the sealability between the valve seat 50 and the valve ball 31a, 31b. In this case, as a result, the area of the seat flow path 54 is reduced. When the flow path area is reduced, the resistance increases when the transfer fluid flows in the seat flow path 54, which is not preferable from the viewpoint of pump performance.

On the other hand, when the difference between the maximum value Lmax and the minimum value Lmin of the horizontal distance L is small, as described above, the effect of concentrating the gas, below the valve ball 31a, 31b, toward a section of the seat flow path's inner circumferential surface 55 where the horizontal distance L becomes the maximum value Lmax becomes small. As a result, the effect of preventing the occurrence of gas lock is reduced, thus not preferable. Therefore, as a result of experiments conducted by the inventor of the present invention in pursuit of an increased preventive effect on the gas lock occurrences while considering the influence on the pump performance, the above stated difference of "10% or more and 30% or less" and preferably "15% or more and 20% or less" of the maximum value Lmax was derived.

As shown in FIGS. 6 and 7, the seat holder 40 supports the lower end surface 53 of the valve seat 50 disposed at the lowermost position in the suction valve 10A and the discharge valve 10B, and is formed with a cylindrical exterior and a concaved fitting part 41 which fits a lower part of the case body 30b. The bottom surface of the fitting portion 41 constitutes a support surface 42 for supporting the lower end surface 53 of the valve seat 50 by surface contact.

The seat holder 40 has a holder flow path 44 which communicates the support surface 42 with the lower end surface 43 and flowing the transfer fluid inside and communicating with the seat flow path 54 of the valve seat 50. The holder flow path 44 has the same central axis P as the central axis P of the valve seat 50. The holder flow path 44 has a plurality of ridges 46 that project from the holder flow path's inner circumferential surface 45 toward the central axis P and extend parallel to the central axis P.

In the seat holder 40 configured in this manner, the gas in the transfer fluid transported from the lower side of the seat holder 40 rises concentrating in the areas between respective ridges 46 when it rises in the holder flow path 44, without spreading annually over the entire circumference of the holder flow path's inner circumferential surface 45. Then, the gas locally concentrated between the ridges 46 of the holder flow path's inner circumferential surface 45 enters the gas accumulation section 53a of the valve seat 50 as a plurality of flows, and rises in the seat flow path 54.

As described above, in the holder flow path 44 of the seat holder 40, the ridges 46 ensure in advance the flow of the gas accumulated in the gas accumulation section 53a of the valve seat 50. Therefore, it is expected that, in addition to the effect of using the valve seat 50 alone, the situation that the gas spreads annularly over the entire circumference of the seat flow path's inner circumferential surface 55 of the seat flow path 54, causing the force to lift the valve balls 31a and 31b to disperse, can be prevented more reliably. As described above, when the seat holder 40 having the holder flow path's inner circumferential surface 45 on which the ridges 46 are formed is used, the function and effect of the valve seat 50 of the present embodiment can be further enhanced.

Figure 8:
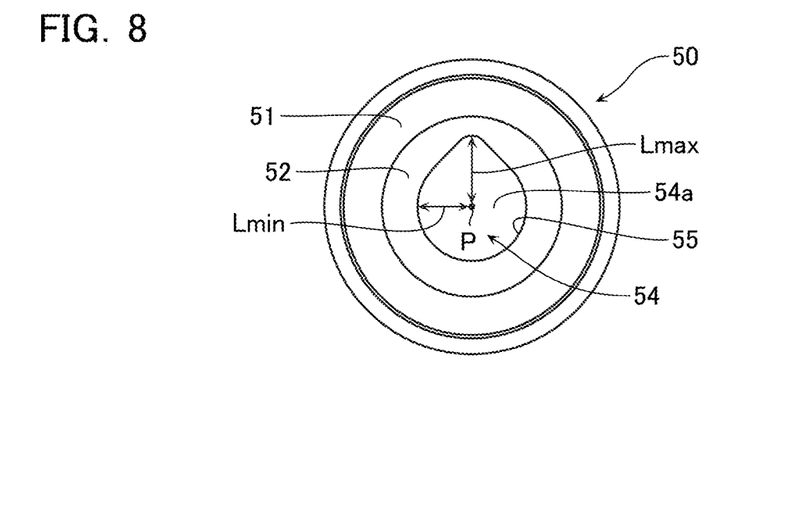
FIG. 8 is a plan view showing a modification of the valve seat.
Figure 9:
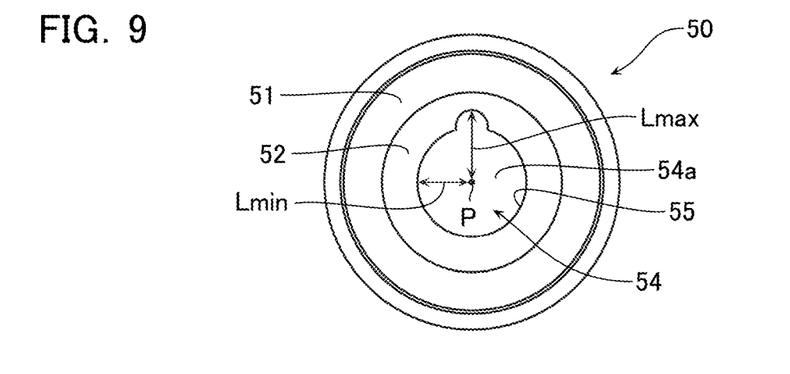
FIG. 9 is a plan view showing a modification of the valve seat.
Figure 10:
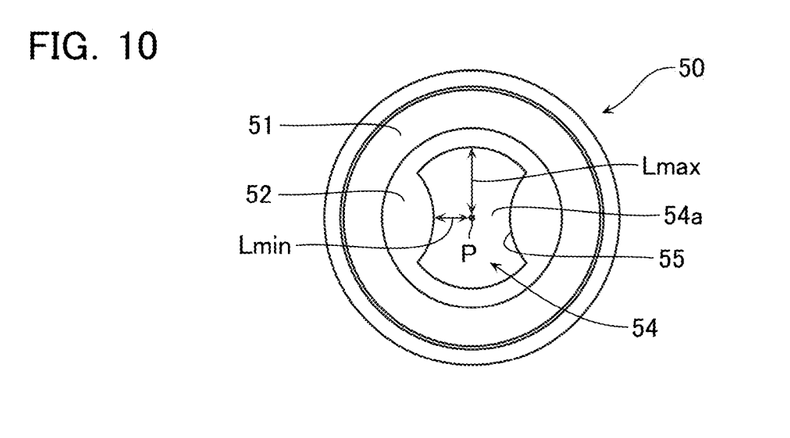
FIG. 10 is a plan view showing a modification of the valve seat.

FIGS. 8 to 15 are plan views showing modifications of the valve seat 50 described above. Although the valve seat 50 mentioned above is provided with a seat flow path 54 which has an elliptical shape viewing in the horizontal cross section, the valve seat 50 may be provided with a seat flow path 54 with the following shapes viewing in the horizontal cross section. That is, the seat flow path 54 may be formed in any one of a drop shape as shown in FIG. 8, a notch shape (partially deformed circular shape) as shown in FIG. 9, and a concaved shape as shown in FIG. 10.

Figure 11:
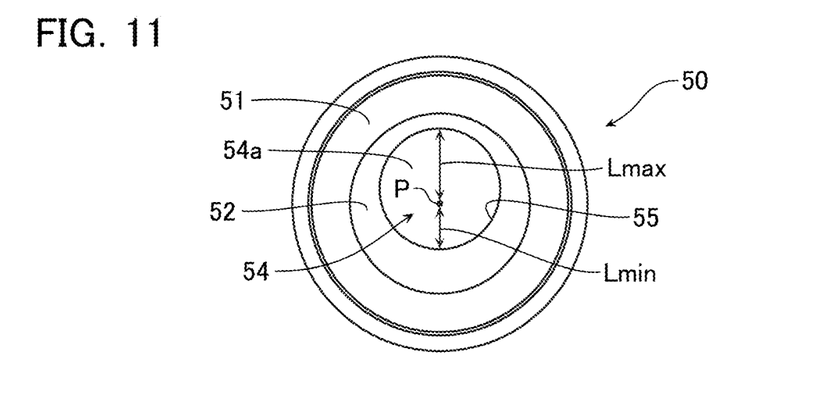
FIG. 11 is a plan view showing a modification of the valve seat.
Figure 12:
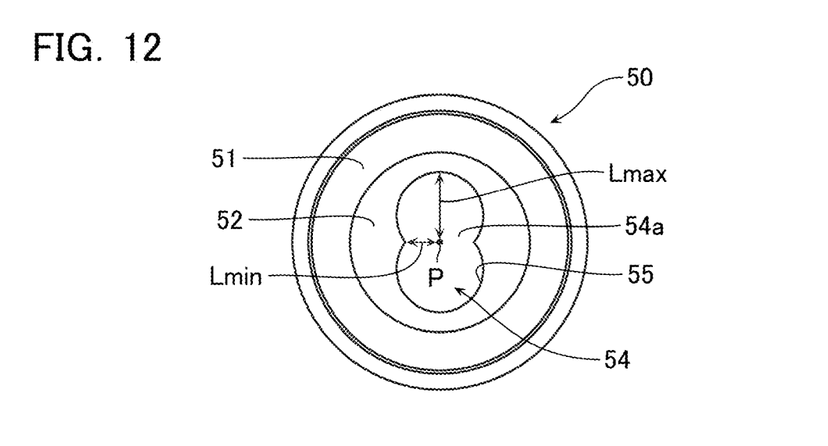
FIG. 12 is a plan view showing a modification of the valve seat.
Figure 13:
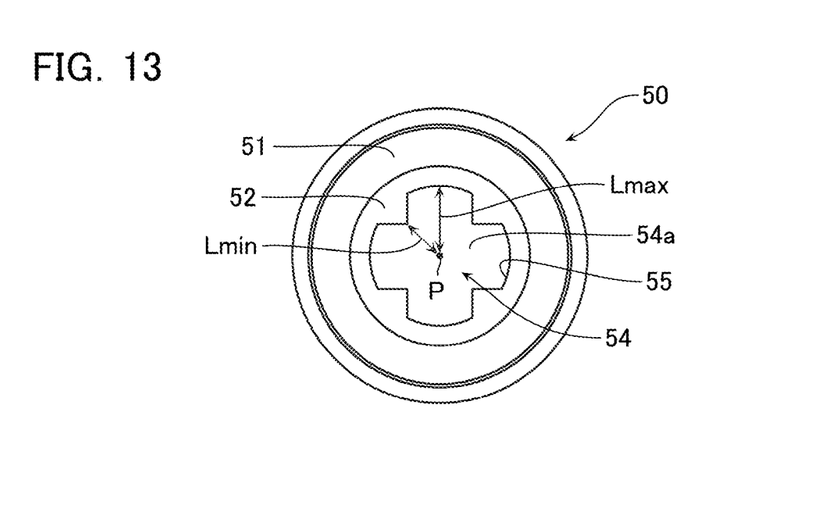
FIG. 13 is a plan view showing a modification of the valve seat.
Figure 14:
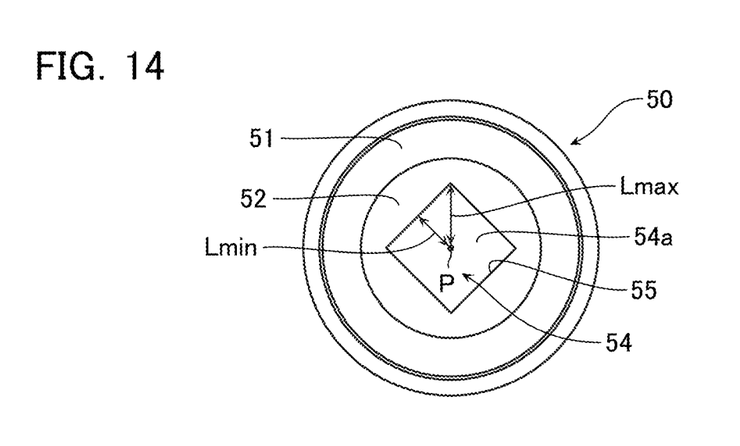
FIG. 14 is a plan view showing a modification of the valve seat.
Figure 15:
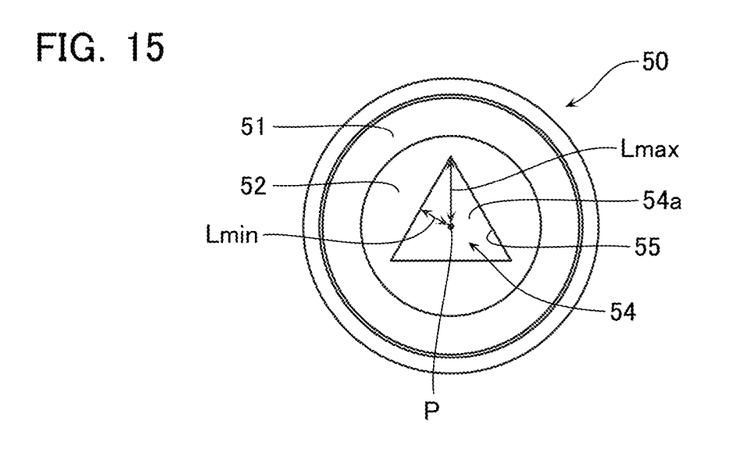
FIG. 15 is a plan view showing a modification of the valve seat.

In addition, the seat flow path 54 of the valve seat 50 may be shaped as any one of an eccentric shape (eccentric circular shape) as shown in FIG. 11, an eyeglass shape (overlapping circular shape) as shown in FIG. 12, a cross shape as shown in FIG. 13, a square shape (rectangular shape) as shown in FIG. 14, and a triangle shape as shown in FIG. 15.

With any of the above shapes, because the seat flow path 54 is not constant over the entire circumference of the seat flow path inner circumferential surface 55, the gas rises concentrating toward the side of the seat flow path's inner circumferential surface 55 where the horizontal distance L becomes the maximum value rather than the minimum value. Therefore, the occurrence of gas lock is effectively prevented while maintaining the sealing property of the valve ball 31a, 31b.

Although the embodiments of this invention were described above, these embodiments were shown as examples and not intended to limit the scope of invention. These novel embodiments can be implemented in other various forms; and various omissions, replacements and changes can be made without departing from the gist of the invention. These embodiments and their variations are included in the scope and the gist of the invention, and are included in the invention described in the claims and the equivalents thereof.

For example, in the above embodiment, the shape of the seat flow path 54 of the valve seat 50 is an elliptical shape or the like in the horizontal cross section; however, various shapes can be employed as long as they are formed such that the horizontal distance L from the central axis P to the seat flow path's inner circumferential surface 55 excluding the seating surface 52 and the lower end surface 53 is not constant over the entire circumference of the seat flow path inner circumferential surface 55 of the seat flow path 54.

EXPLANATION OF REFERENCE CODES 1 metering pump
2 drive shaft
4 diaphragm
5 pump head
5a suction port
5b discharge port
6 pump chamber
8, 9 connection port
10A suction valve
10B discharge valve
20A, 20B connection adapter
29A, 29B joint
30a, 30b case body
31a, 31b valve ball
32a, 32b valve guide
40 seat holder
41 fitting part
42 support surface
43 lower end surface
44 holder flow path
45 holder flow path's inner circumferential surface
46 ridge
50 valve seat
51 upper end surface
52 seating surface
53 lower end surface
54 seat flow path
55 seat flow path's inner circumferential surface

The invention claimed is:

1. A valve seat disposed below a valve ball, comprising an annular member having in a center thereof a hole section forming a flow path through which a transfer fluid flows,
    wherein, the valve seat is arranged so that a central axis of the hole section is set in an up-and-down direction, and comprises a seating surface on which the valve ball seats connected to an upper end of the hole section and fitting to an external shape of the valve ball to form a complete seal, and a lower end surface connecting to the lower end of the hole section, and
    wherein, the hole section is formed in a predetermined shape so that a horizontal distance from the central axis to an inner circumferential surface of the hole section is not constant over an entire circumference of the inner circumferential surface of the hole section.

2. The valve seat according to claim 1, wherein the predetermined shape is a shape in which a difference between a maximum value and a minimum value of the horizontal distance throughout the entire circumference of the inner circumferential surface of the hole section is between 10% and 30% of the maximum value.

3. The valve seat according to claim 1, wherein the predetermined shape is one of a partially deformed circular shape, an elliptical shape, a drop shape, a concaved shape, an eccentric circular shape, an overlapping circular shape, a cross shape, a rectangular shape, and a triangle shape, when viewed at a horizontal cross section.

4. A valve structure having a valve ball, a valve seat below the valve ball, and a seat holder supporting the valve seat, wherein
    the valve seat comprises an annular member having in a center thereof a hole section forming a flow path through which a transfer fluid flows,
    the valve seat is arranged so that a central axis of the hole section is set in an up-and-down direction,
    the valve seat comprises a seating surface on which the valve ball seats connected to an upper end of the hole section and fitting to an external shape of the valve ball to form a complete seal, and a lower end surface connecting to the lower end of the hole section,
    the seat holder comprises a holder flow path communicating with the flow path,
    the hole section is formed in a predetermined shape in which a horizontal distance from the central axis to an inner circumferential surface of the hole section is not constant throughout an entire circumference of the inner circumferential surface of the hole section, and
    the holder flow path comprises a plurality of ridges protruding toward the central axis from an inner circumferential surface of the holder flow path, arranging at equal intervals in the circumferential direction and extend parallel to the central axis.

5. The valve structure according to claim 4, wherein the predetermined shape is a shape in which a difference between a maximum value and a minimum value of the horizontal distance across the entire circumference of the inner circumferential surface of the hole section is between 10% and 30% of the maximum value.

6. The valve structure according to claim 4, wherein the predetermined shape is one of a partially deformed circular shape, an elliptical shape, a drop shape, a concaved shape, an eccentric circular shape, an overlapping circular shape, a cross shape, a rectangular shape, and a triangle shape, when viewed at a horizontal cross section.

* * * * *